Sept. 27, 1938. V. T. MALCOLM 2,131,709
METAL TREATING
Filed May 19, 1937
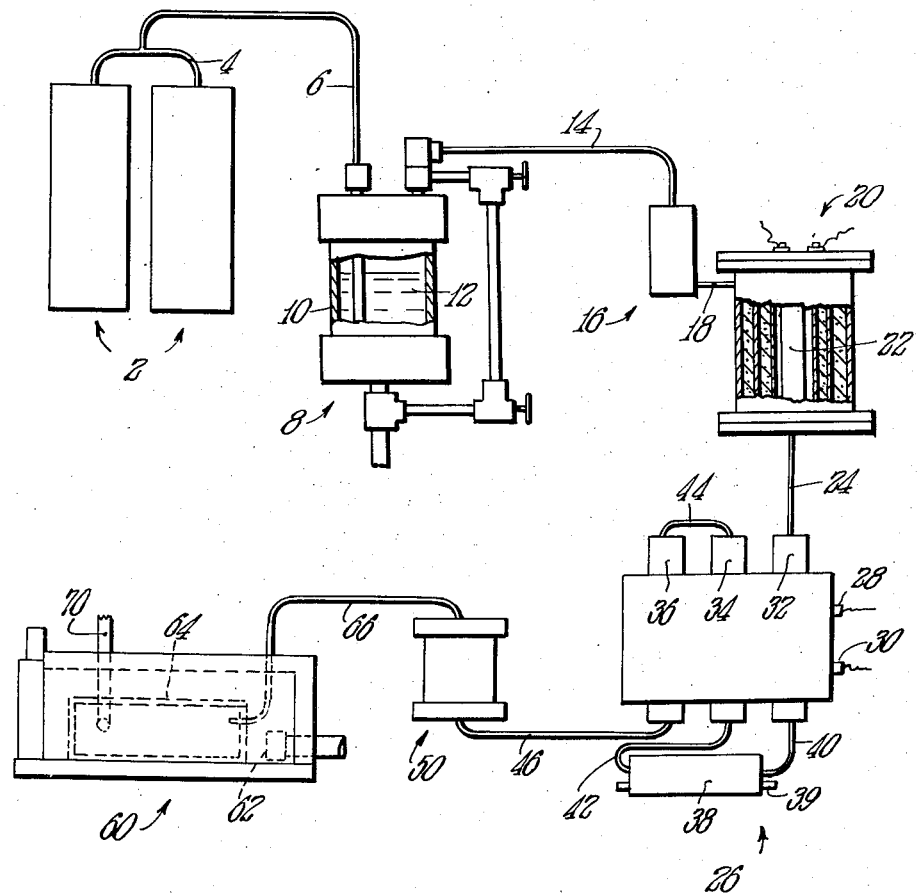
INVENTOR.
Vincent T. Malcolm
BY Walter C. Ron
ATTORNEY.

Patented Sept. 27, 1938

2,131,709

UNITED STATES PATENT OFFICE 2,131,709

METAL TREATING

Vincent T. Malcolm, Indian Orchard, Mass., assignor to The Chapman Valve Mfg. Co., Indian Orchard, Mass., a corporation of Massachusetts Application May 19, 1937, Serial No. 143,419

2 Claims. (Cl. 148—16)

This invention relates to improvements in apparatus for and methods of treating metal.

The principal objects of the invention are directed to the provision of an apparatus for and method of treating metals such as annealing the same. The annealing may be more specifically called bright annealing of carbon containing metals such as steels. According to the novel features of the invention various metals such as carbon-containing steels may be heated at the relatively higher temperatures without decarbonization, or at least without decarbonization which is objectional, and the annealed metal is free from scale after the treatment and its color or brightness is not affected thereby.

The main difficulty in connection with the annealing of metals under present day practice where hydrogen is employed as the essential element is that there is a tendency toward decarbonization which is objectional and this is believed to be due, in large measure at least, to the fact that the hydrogen carries more or less water vapor. Not only are ease and efficiency in operation attained according to the present invention, but the above and other objections are overcome.

Various and numerous other novel objects and advantages will be apparent from the following description of the invention in the form at present preferred, reference being had to the accompanying drawing wherein:

The figure is a more or less diagrammatic plan view showing one form of apparatus for carrying out the novel features of the invention.

The apparatus to be employed for the invention may be varied within wide limits in order to attain the objects of the invention without departing from the spirit and scope thereof. However, with particular reference to the drawing more in detail, the invention will now be fully described.

According to the invention in its broad aspects, ammonia gas is passed through various units and into a furnace. The object is to disassociate the nitrogen and hydrogen constituents of the said gas so that the hydrogen constituent predominates in the furnace for the metal-treating operation.

Means for supplying ammonia gas include one or more tanks such as 2 and the gas is led therefrom through suitable conduits 4 and 6 to and through a scrubbing unit indicated by 8. Unit 8 is in the form of a closed container 10 which carries a liquid 12. The gas passes through the liquid of the scrubber and is delivered by a conduit 14 to a dryer unit 16.

The liquid 12 in the scrubber may consist of any suitable substance adapted to scrub the ammonia gas, such as, for example, a hydrocarbon liquid such as benzol with which the ammonia gas intimately contacts on its passage through the scrubber for the scrubbing action.

The dryer unit 16 is preferably also in the form of a closed container and in this there is disposed a certain amount of calcium chloride, phosphorous pentoxide, or anhydrous phosphorous or some other such substance which is adapted to pick up moisture and thereby more or less dry the ammonia gas.

From the dryer unit 16 the ammonia gas passes through a conduit 18 into and through a cracking unit indicated by 20. This unit 20 may be similar to that shown in my United States Letters Patent No. 1,929,392 and its function is to disassociate the nitrogen and hydrogen constituents of the ammonia gas. To accomplish this, heat is provided in the unit to, say, a temperature of approximating 1200° F. or thereabouts, and the heating may be accomplished by a heating coil or coils 22 associated with the unit 20.

From the cracking unit 20, the ammonia gas passes through a conduit 24 to a catalyst furnace indicated by 26. The catalyst furnace 26 is heated in some suitable manner as by electrical heating elements, indicated by 28 and 30 and includes a plurality of tubes such as indicated at 32, 34, 36, and 38 and which are connected by conduits 40, 42 and 44 in some such manner as shown. The tube 38 is heated by a heating unit such as an electrical unit indicated by 39.

The tube 32 may contain powdered tungsten or some other suitable material which is adapted to absorb water vapor. The tube 34, on the other hand, preferably contains powdered silicon or magnesium while the tube 36 preferably contains powdered silicon and powdered chromium. The tube 38 preferably contains alumina.

As the disassociated elements pass through the unit 26, the substance in tube 32 tends to pick up water vapor while the materials in the other tubes tend to activate the hydrogen constituent. Then the disassociated constituents of the ammonia gas with the hydrogen activated as stated pass through a conduit 46 to and through an ionizer unit 50.

The ionizer 50 is preferably a device wherein there is an electric discharge and it may take the form of the apparatus shown in United States Letters Patent No. 1,975,063, issued to me on September 25, 1934. The function of the unit 50, according to this invention is to ionize or activate the hydrogen constituent of the ammonia gas.

A furnace is represented by 60 which is of the closed type and it may be heated in various ways such as by fuel delivered through a nozzle 62. In the furnace 60 there is a closed container 64 for the metal parts which are to be treated.

The activated hydrogen is delivered to container 64 by a conduit such as 66 whereby the work being treated in the furnace is in contact with the activated hydrogen. Unconsumed hydrogen and the nitrogen constitutent may be led from the compartment 64 of the furnace outwardly through vent 70 to the atmosphere.

The process of the invention may be carried out at different temperatures so that the operating temperature prevailing in the furnace may be varied within wide limits depending upon the type or kind of metal being treated and the result desired. When operating at operating temperatures for bright annealing such carbon-containing metal as steel the metal being treated retains its color and brightness without objectional decarbonization and without producing scale usually encountered in operating with hydrogen.

Where the operating temperature prevailing in the furnace is 1700° or thereabouts the temperature employed in the catalyst furnace is preferably somewhat less, say 1200° F. while the temperature employed in the cracking unit is approximately 1200° F. in the neighborhood of that prevailing in the catalyst unit.

In carrying out the invention various changes and modifications may be made without departing from the spirit and scope thereof. What it is desired to claim and secure by Letters Patent of the United States is:

1. The process of bright annealing of carbon-containing metal which consists in, confining the metal to be treated in a closed compartment and in heating the work by confining the compartment in a heating furnace, leading the disassociated constituents of ammonia gas into said compartment subsequent to passing the ammonia gas through separate units including a scrubber, a dryer, a cracker, a catalytic heater and an ionizer whereby the hydrogen constituent is activated and ionized prior to contact with the metal, the temperature prevailing in the separate cracker, and catalyst heater being approximately 1200° F. and in the furnace from 1200° F. to 1700° F.

2. The process of bright annealing of carbon-containing metal which consists in, confining the metal to be treated in a closed compartment and in heating the work by confining the compartment in a heating furnace, leading the disassociated constituents of ammonia gas into said compartment subsequent to passing the ammonia gas through separate units including a scrubber, a dryer, a cracker, a catalytic heater and an ionizer whereby the hydrogen constituent is activated and ionized prior to contact with the metal, the temperature prevailing in the catalytic heater being in the neighborhood of 1200° F. and below that prevailing in the furnace which may be in the neighborhood of 1700° F.

VINCENT T. MALCOLM.